United States Patent [19]

Mizunuma et al.

[11] Patent Number: 4,963,190
[45] Date of Patent: Oct. 16, 1990

[54] DISPERSANT COMPOSITION FOR CEMENT

[75] Inventors: Tatsuya Mizunuma; Ryoichi Tamaki; Shoji Kanzaki; Yoshiaki Tanisho; Fuzio Yamato, all of Wakayama, Japan

[73] Assignee: Kao Corporation, Tokyo, Japan

[21] Appl. No.: 325,382

[22] Filed: Mar. 17, 1989

[30] Foreign Application Priority Data

Apr. 20, 1988 [JP] Japan ................................. 63-97501

[51] Int. Cl.$^5$ ...................... C04B 24/28; C04B 22/06; C04B 24/04
[52] U.S. Cl. ..................................... 106/724; 106/823; 524/5; 524/342; 524/344; 524/559
[58] Field of Search .................. 106/90, 315, 314; 524/5, 342, 344, 559

[56] References Cited

U.S. PATENT DOCUMENTS

| | | | |
|---|---|---|---|
| 3,429,724 | 2/1969 | Keenum et al. | 106/90 |
| 4,223,733 | 9/1980 | Bodor et al. | 106/90 |
| 4,243,430 | 1/1981 | Sperry et al. | 524/432 |
| 4,530,955 | 7/1985 | Wilson et al. | 524/434 |
| 4,586,960 | 5/1986 | Iizuka et al. | 106/90 |

*Primary Examiner*—Mark L. Bell
*Assistant Examiner*—David M. Brunsman
*Attorney, Agent, or Firm*—Flynn, Thiel, Boutell & Tanis

[57] ABSTRACT

An aqueous dispersant composition for cement comprises 100 parts by weight of a copolymer of an olefin having 2 to 8 carbon atoms and an ethylenically unsaturated dicarboxylic anhydride, the copolymer being in the form of fine particles having an average size of 0.1 to 20 micrometers, 15 to 300 parts by weight, of zinc, as zinc oxide or zinc hydroxide, and water, the composition being adjusted to have a pH value of 6 to 12.

10 Claims, No Drawings

DISPERSANT COMPOSITION FOR CEMENT

This invention relates to admixtures for cements or cement compositions and more particularly, to admixtures for cement which can prevent a lowering, with time, of the workability of concrete, mortar or cement pastes which are hydraulic cement compositions, thereby enabling one to remarkably improve their storage stability in water so that the working and operating properties of the cement compositions can be eventually improved.

PRIOR ART

After kneading, conventional cement compositions, comprised of a mixture of a cement, water, sand, gravel and admixtures, gradually lose their fluidity along with their workability and operability as the physical and chemical coagulation of the cement particles proceed with time. This leads to the disadvantage that a limitation is placed on the working time of the cement composition.

In order to solve the above problems, various methods of preventing the lowering of the workability of cement compositions have been heretofore proposed. For instance, fine particles of a copolymer of a lower olefin and maleic anhydride (e.g. Japanese Patent Publication No. 63-5346) or an insoluble metal complex of an ethylenically unsaturated dicarboxylic acid copolymer (Japanese Laid-open Patent Application No. 62-83344) have been formulated in cement, so that they become soluble in water by reaction with alkalis in the cement, thereby showing a gradual effect of improving the fluidity of the cement and thus keeping the fluidity of the cement over a long term.

The fine particles mainly composed of the above-mentioned copolymer of a lower olefin and maleic anhydride are usually preserved in the form of a dispersion in water and used as such. However, during the preservation of the fine particles of the maleic anhydride copolymer, they undergo a gentle hydrolysis reaction in water. This may cause the anhydride ring to be opened because of to the hydrolysis reaction during the storage but before the particles are employed as an admixture for cement. As a result, a disadvantage occurs in that the gradual improving property lowers as time passes and the particles cannot show the characteristic property as a gradual fluidity improver.

On the other hand, the insoluble metal complex of the ethylenically unsaturated dicarboxylic acid copolymer has a remarkable influence on the gradual improving property when formulated in cement compositions because of the forms of the copolymer to be complexed and the inorganic chemical having metal ions. More particularly, for the same metal salt or complex of a copolymer and an inorganic chemical, the form and bonding strength of the complex varies depending upon the manner of bonding and the solubility and particle size of the copolymer. This leads to the disadvantage that the gradual or slow fluidity improving property is not constant with a lowering of the property with time.

SUMMARY OF THE INVENTION

The present inventors made intensive studies in order to solve the prior art problems and, as a result, found that a dispersion of a fine powder of a copolymer of a $C_2$ to $C_8$ olefin and an ethylenically unsaturated dicarboxylic anhydride in water having a pH of 6 to 12 along with zinc oxide or zinc hydroxide is effective in preventing the lowering of the gradual fluidity improving property when stored in water over a long term and can stably improve the working and operating properties of the resultant cement composition. The present invention is accomplished based upon the above finding.

An aqueous dispersant composition for cement comprises 100 parts by weight of a copolymer of an olefin having 2 to 8 carbon atoms and an ethylenically unsaturated dicarboxylic anhydride, the copolymer being in the form of fine particles having an average size of 0.1 to 20 microns, 15 to 300 parts by weight, of zinc, as zinc oxide or zinc hydroxide, and water, the composition being adjusted to have a pH value of 6 to 12.

It is preferable that the dicarboxylic anhydride is maleic anhydride and the copolymer has an average molecular weight of 500 to 50,000.

In the aqueous composition, the copolymer and the zinc compound may form a salt therebetween or a partial salt thereof. In advance of using the composition, the salt may be produced positively by heating. Alternatively it may be produced by allowing the composition to stand as it is.

Presumably, the mechanism of the storage stability according to the invention is considered to be as follows.

The copolymer of the $C_2$ to $C_8$ olefin and the ethylenically unsaturated dicarboxylic anhydride is attacked with hydroxide ions, so that the anhydride rings are opened and converted into a carboxylic acid or a salt thereof.

If this carboxylic acid or its salt is soluble in water, this portion dissolves in water to expose a fresh copolymer portion. This fresh portion is also attacked with hydroxide ions and dissolves in water. The above procedure is repeated by which the copolymer loses its gradual fluidity improving property during the storage. However, if the salt of the carboxylic acid formed by the attack with the hydroxide ions is insoluble in water and deposits fixedly on the copolymer surface, the exposure of a fresh surface of the copolymer particles is suppressed, so that its stability in water can be remarkably improved.

Based on the above assumption, the present inventors made studies on monovalent to trivalent metals as those metals capable of forming insoluble salts and found that zinc was effective in improving the storage stability.

Zinc is reactive with a ring-opened product of the copolymer and the resultant salt of the copolymer is insoluble in water. With Na, K, Ca, Mg and the like, the resultant salts of the copolymer have great solubilities and become sticky, thus being unstable. On the other hand, for Al, Fe and the like, the reaction with a ring-opened product of the copolymer proceeds only slowly and cannot form an insoluble film on copolymer particles. Moreover, it is also confirmed that if zinc is used and the aqueous dispersion has a pH outside a range of from 6 to 12, the resultant copolymer salt becomes soluble in water and good storage stability cannot be attained.

The present invention is described in more detail.

The olefins having 2 to 8 carbon atoms and used in the copolymer of the $C_2$ to $C_8$ olefin and the ethylenically unsaturated dicarboxylic acid include, for example, ethylene, propylene, n-butene, isobutylene, n-pentene, cyclopentene, 2-methyl-1-butene, n-hexene, 2-methyl-1-pentene, 3-methyl-1-pentene, 4-butyl-1-pentene, 2-ethyl-1-butene, diisobutylene and mixtures thereof, of which isobutylene is preferred. The ethylenically unsaturated dicarboxylic acids include, for example, maleic anhydride, itaconic anhydride, citraconic anhydride and the like, of which maleic anhydride is preferred.

The average molecular weight of the copolymer is preferably in the range of from 500 to 50,000. If the average molecular weight is smaller than the above range, dispersability becomes deficient. Over the above range, the resultant copolymer becomes more effective as a coagulant rather than the dispersant, and do not exhibit a slump loss-inhibiting effect. The average molecular weight of the copolymer used in the practice of the invention is intended to means a weight average molecular weight which is determined by aqueous gel permission chromatography using polystyrenesulfonic acid as a reference material.

The amount of zinc oxide or zinc hydroxide is in the range of from 15 to 300 parts by weight as zinc metal, preferably from 40 to 100 parts by weight, per 100 parts by weight of the copolymer of the $C_2$ to $C_8$ olefin and the ethylenically unsaturated dicarboxylic acid. It is preferred that 1 to 2 moles of zinc are supplied to one anhydride ring of the copolymer. If the amount is less than the above range, a film covering the particle surfaces of the copolymer sufficiently is not formed and a good effect of the addition cannot be obtained. On the other hand, an excessive amount is not practical and gives an adverse influence on a hardened cement composition with respect to coloration, setting and the like.

In the practice of the invention, zinc oxide or zinc hydroxide is used as a zinc compound. Especially, when zinc hydroxide is used, there may be used zinc hydroxide, but also zinc carbonate, zinc sulfate, zinc chloride and the like compounds may be used in which an alkali is added to the dispersion system in order to maintain the pH of the system at 6 to 12, with the result that zinc hydroxide is formed in the system.

In the above embodiment, there is described the case where the copolymer and zinc oxide or zinc hydroxide are both present in water at a predetermined ratio. In the present invention, the copolymer of the olefin and the ethylenically unsaturated dicarboxylic anhydride is hydrolyzed in water, permitting the anhydride ring to be opened and converted into an ethylenically unsaturated dicarboxylic acid joined to the olefin. This acid reacts with the zinc compound to form a zinc salt of the copolymer. Accordingly, the composition of the admixture for cement according to the invention varies as time passes. Initially, the acid anhydride copolymer and a zinc compound are contained in the dispersion separately, but the acid anhydride copolymer and the zinc compound reduce in amount with the passage of time with an increasing amount of the resultant copolymer and zinc salt. After a long time being passed, the acid anhydride copolymer and the zinc compound are rarely found in the system and the copolymer and zinc salt becomes predominant.

The admixture for cement of the invention may be an aqueous dispersion which is not limited compositionally in the above sense. The aqueous dispersion of any compositional degree may be used as the admixture for cement and exhibits a similar degree of the gradual improving property. It should be noted here that the relationship in amount between the acid anhydride copolymer and the zinc compound prior to hydrolysis has been illustrated only for convenience' sake.

Accordingly, the acid anhydride copolymer and the zinc compound may have been previously reacted to make an aqueous dispersion mainly composed of the salt of the copolymer and zinc, or mere mixing of both compounds is sufficient for use as an admixture.

The average size of the copolymer particles used in the present invention should preferably be in the range of from 0.1 to 20 $\mu$m, more preferably from 0.1 to 5 $\mu$m.

If the average size is less than 0.1 $\mu$m, the gradual improving speed becomes too high, so that a slump retention of concrete cannot be obtained. On the other hand, over 20 $\mu$m, the gradual improving speed is so slow that an increasing amount is necessary and localization takes place, giving an adverse influence on properties of the resultant concrete.

The copolymer to use in the invention is required to have the specified size. Such copolymer particles can be obtained by pulverizing. Also they can be obtained by using cellulose ester or cellulose ether in preparing them by way of a conventional precipitation-copolymerizing method where usual aromatyic hydrocarbons are used for a solvent, a usual initiator such as an azocompound, an organic peroxide and an inorganic peroxide may be used and a polymerization temperature ranges from 30 to 150 degree C., preferably from 40 to 100 degree C.

The average size of zinc oxide or zinc hydroxide is similarly and preferably in the range of from 0.1 to 20 $\mu$m, more preferably from 0.1 to 5 $\mu$m.

If the particle sizes are not proper, they should be pulverized or milled by a suitable means. The milling means used for this purpose may be any ordinarily employed ones such as, for example, a ball mill attritor, a sand mill and the like.

The copolymer and zinc oxide or zinc hydroxide used in the present invention is dispersed in water having a pH of from 6 to 12. When the pH of the water is less than 6, the salt becomes soluble. With a pH over 12, the system becomes unstable.

The admixture for cement of the invention may be used in combination with known dispersants such as naphthalenesulfonic acid/formaldehyde high condensation product dispersions, sulfonated melamine resin dispersants, ligninsulfonic acid dispersants, polycarboxylic acid dispersants, polycarboxylic acid ester dispersants, and the like. In application, an aqueous slurry of these dispersants is added to the admixture of the invention. The resultant mixture should be stored while keeping the pH at 6 to 12.

The admixture of the invention may be added to cement compositions by dissolving the admixture in water for kneading, or by adding the admixture to once kneaded cement compositions.

The invention does not allow lowering of the gradual improving property during storage over a long term and ensures a stable performance.

According to the invention, the fluidity of concrete compositions is enhanced and can be maintained at a constant level. Thus, the cement admixture of the invention has wide utility in various fields. For instance, when the admixture is used as an aid for pump feed of concrete, it will become possible to prevent an abrupt rise of the feed pressure at the time when the pump feed is re-started after interrupt of the operation or after troubles of the pump. Alternatively, when it is used as an aid for centrifugal fixing, the admixture can allow the fluidity of concrete prior to shaping, to be maintained over a long time, making easy finishing of a final product.

Still alternatively, the admixture may be effectively used as an aid in cement milk or a grout of mortar and may be used in cement compositions to be charged to a Tremy tube, concretes in water and concretes for continuous underground walls in order to maintain their fluidity and to prevent separation of the materials.

EXAMPLES

The present invention is described in more detail by way of examples, which should not be construed as limiting the invention.

EXAMPLE 1

A concrete test was effected using various compositions.

The mixing ratios of a copolymer of isobutylene and maleic anhydride (average molecular weight of about 10,000 when determined by GPC) and zinc oxide, zinc hydroxide or various metal compounds, the average particle size of the copolymer, and the pH are shown in Table 1.

The adjustment of the particle size of the copolymer was made by crude milling of an aqueous slurry of particles of the copolymer in a sand mill (made by Igarashi Kiki K.K.) for certain times. Predetermined amounts of the respective metal compounds were formulated and dispersed in the resultant aqueous slurry of the copolymer particles having a given size, which were used for the test. It will be noted that sample No. 5 in Table 1 is a product obtained by reaction of the composition No. 4 at 70° C. for 5 days.

The fine particles of the copolymers No. 27 and No. 28, shown in Table 1, were produced by the below mentioned method.

607 parts by weight of toluene, 68.6 parts by weight of maleic anhydride and 3.4 parts by weight of ethyl cellulose were placed in a reactor. The ethyl cellulose was a product, ethyl cellulose N-7 (tradename) of Hercury Co., Ltd., having a ethoxy content of 48% and a molecular weight of 62,000, calculated as polystyrene. The mixture was heated up to 70° C., while stirred, in nitrogen gas. 6.8 parts by weight of 2.2'-azoisobutylnitrile was added thereto as a polymerization initiator. At 70° C., then, 4.5 parts by weight of isobutylene gas was blown thereinto in a continuous way for 3 hours. The reaction mixture was allowed to stand at the same temperature for aging for 2 hours, while stirred. Then it was cooled down. The product mixture was filtrated and dried to obtain a copolymer of isobutylene and maleic anhydride having an average particle size of 0.5 μm and an average molecular weight of 10,000.

The average molecular weight is determined by gel permeation chromatography, and given in terms of weight-average molecular weight, calculated as sodium polystyrene sulfonate, using a light-transparent, centrifugal sedimentation size distribution measuring device, SACP-3 of Shimazu Seisakusho Co., Ltd.

The test results immediately after the formulation are shown in Table 2 and the test results after 3 months of storage at 40° C. are shown in Table 3.

Materials Used
Cement: ordinary Portland cement specific density=3.17
Fine aggregate: river sand from Kinokawa, specific density=2.57
Coarse aggregate: ground stones from Takarazuka, specific density=2.59
Formulation:
water/cement=53.0%
rate of the fine aggregate=48.0%
amount of the cement=320 kg/m$^3$
amount of the fine aggregate=850 kg/m$^3$
amount of the coarse aggregate=926 kg/m$^3$ The kneading of the composition was carried out by the use of a 100 liter tilting column mixer on the basis of the above formulation where 50 liters of concrete materials and a predetermined amount of each sample were charged and kneaded at high speed for 2 minutes, followed by agitation at a constant speed of 4 r.p.m. and measurement of slump at a certain time.

TABLE 1

| No. | Type of Product | Metal Compound | Mixing Ratio of Copolymer/Metal (parts by wt.) | Average Size (μm) | pH*1 |
|---|---|---|---|---|---|
| 1 | Product of Invention | zinc oxide | 100/15 | 0.7 | 6.3 |
| 2 | | zinc oxide | 100/50 | 0.1 | 6.4 |
| 3 | | zinc oxide | 100/50 | 0.5 | 6.4 |
| 4 | | zinc oxide | 100/50 | 1.6 | 6.4 |
| 5 | | zinc oxide*2 | 100/50 | 1.8 | 6.2 |
| 6 | | zinc oxide | 100/50 | 19.3 | 6.3 |
| 7 | | zinc oxide | 100/100 | 0.5 | 7.2 |
| 8 | | zinc oxide | 100/250 | 0.7 | 7.2 |
| 9 | | zinc hydroxide | 100/50 | 0.8 | 6.6 |
| 10 | | zinc hydroxide | 100/100 | 0.5 | 7.2 |
| 27 | | zinc hydroxide | 100/100 | 0.5 | 7.1 |
| 28 | | zinc oxide | 100/100 | 0.5 | 7.0 |
| 11 | for comparison | zinc oxide | 100/10 | 0.8 | 6.2 |
| 12 | | zinc oxide | 100/50 | 27.6 | 6.3 |
| 13 | | zinc oxide | 100/350 | 0.5 | 7.3 |
| 14 | | zinc sulfate | 100/50 | 0.7 | 5.2 |
| 15 | | zinc chloride | 100/50 | 0.8 | 5.2 |
| 16 | | zinc carbonate | 100/100 | 1.0 | 5.4 |
| 17 | | aluminium hydroxide | 100/50 | 5.0 | 5.4 |
| 18 | | calcium hydroxide | 100/100 | 0.9 | 12.5 |
| 19 | | — | 100/0 | 0.8 | 5.2 |
| 20 | | nil | | — | — |

*1: pH measured usin a 20% solution.
*2: Thermally treated product

TABLE 2

| No. | Type of Product | Immediately After Formulation | Variation of Slump With Time (cm) After 30 min. | After 60 min. | After 90 min. | setting time (hour-minute) initial | final |
|---|---|---|---|---|---|---|---|
| 1 | Product of Invention | 15.4 | 16.3 | 16.5 | 16.2 | 7–14 | 8–44 |
| 2 | | 16.2 | 16.0 | 15.8 | 15.6 | 7–20 | 8–52 |
| 3 | | 15.8 | 16.3 | 16.4 | 16.4 | 7–23 | 8–55 |
| 4 | | 14.8 | 14.7 | 14.8 | 14.7 | 7–25 | 8–56 |

TABLE 2-continued

| No. | Type of Product | Variation of Slump With Time (cm) | | | | setting time (hour-minute) | |
|---|---|---|---|---|---|---|---|
| | | Immediately After Formulation | After 30 min. | After 60 min. | After 90 min. | initial | final |
| 5 | | 15.2 | 15.1 | 15.1 | 15.0 | 7-20 | 8-51 |
| 6 | | 14.0 | 13.8 | 13.0 | 12.0 | 7-20 | 8-52 |
| 7 | | 15.4 | 16.1 | 16.4 | 16.0 | 7-27 | 9-02 |
| 8 | | 15.8 | 16.2 | 16.0 | 16.0 | 7-32 | 9-10 |
| 9 | | 15.6 | 15.9 | 16.3 | 16.0 | 7-20 | 8-48 |
| 10 | | 15.7 | 16.2 | 16.2 | 16.1 | 7-24 | 8-53 |
| 27 | | 15.8 | 15.9 | 16.0 | 15.9 | 7-19 | 8-40 |
| 28 | | 15.9 | 16.0 | 16.0 | 15.8 | 7-25 | 8-45 |
| 11 | for comparison | 15.5 | 16.2 | 16.5 | 16.1 | 7-18 | 8-42 |
| 12 | | 14.2 | 10.1 | 7.3 | 5.2 | 7-26 | 8-58 |
| 13 | | 15.7 | 16.0 | 16.2 | 16.0 | 8-20 | 10-45 |
| 14 | | 15.6 | 15.8 | 15.2 | 15.2 | 7-21 | 8-49 |
| 15 | | 15.7 | 16.0 | 16.2 | 16.1 | 7-18 | 8-42 |
| 16 | | 15.5 | 15.8 | 15.8 | 15.0 | 7-24 | 8-53 |
| 17 | | 15.6 | 15.7 | 15.5 | 15.2 | 7-20 | 8-52 |
| 18 | | 15.8 | 15.6 | 15.5 | 15.0 | 7-22 | 8-50 |
| 19 | | 15.9 | 15.5 | 15.2 | 14.9 | 7-14 | 8-44 |
| 20 | | 14.0 | 9.5 | 6.5 | 5.5 | 6-48 | 8-10 |

*The amount of each admixture is 0.2% of the cement (as effective component).

TABLE 3

Concrete Test Results After 3 Months At 40° d.

| No. | Type of Product | Variation of Slump With Time (cm) | | | | setting time (hour-minute) | |
|---|---|---|---|---|---|---|---|
| | | Immediately After Formulation | After 30 min. | After 60 min. | After 90 min. | initial | final |
| 1 | Product of Invention | 16.8 | 16.3 | 15.0 | 14.2 | 7-15 | 8-39 |
| 2 | | 16.5 | 16.2 | 15.9 | 15.5 | 7-12 | 8-35 |
| 3 | | 15.9 | 16.2 | 16.1 | 16.0 | 7-18 | 8-43 |
| 4 | | 15.4 | 15.8 | 15.0 | 15.8 | 7-23 | 8-40 |
| 5 | | 15.0 | 15.1 | 15.1 | 15.0 | 7-22 | 8-55 |
| 6 | | 14.3 | 14.5 | 14.0 | 13.8 | 7-21 | 8-45 |
| 7 | | 15.3 | 16.2 | 16.2 | 16.0 | 7-25 | 8-49 |
| 8 | | 15.4 | 16.3 | 16.2 | 16.2 | 7-30 | 9-00 |
| 9 | | 16.2 | 16.2 | 16.0 | 16.0 | 7-22 | 8-43 |
| 10 | | 15.7 | 16.3 | 16.3 | 16.0 | 7-20 | 8-45 |
| 27 | | 16.3 | 16.2 | 16.2 | 16.0 | 7-21 | 8-45 |
| 28 | | 15.9 | 16.0 | 16.1 | 16.0 | 7-20 | 8-50 |
| 11 | for comparison | 17.5 | 14.2 | 10.1 | 7.4 | 7-20 | 8-40 |
| 12 | | 14.0 | 12.1 | 7.4 | 5.5 | 7-16 | 8-48 |
| 13 | | 15.5 | 16.0 | 16.2 | 16.0 | 8-45 | 11-05 |
| 14 | | 17.4 | 12.2 | 9.8 | 6.8 | 7-23 | 8-50 |
| 15 | | 17.3 | 13.8 | 9.9 | 5.8 | 7-25 | 8-48 |
| 16 | | 16.8 | 14.5 | 10.9 | 8.2 | 7-21 | 8-42 |
| 17 | | 17.5 | 11.8 | 7.8 | 5.4 | 7-28 | 8-49 |
| 18 | | 17.2 | 12.1 | 8.6 | 6.2 | 7-20 | 8-51 |
| 19 | | 17.6 | 9.7 | 6.5 | 5.5 | 7-24 | 8-52 |
| 20 | | 14.2 | 9.7 | 6.5 | 5.4 | 6-52 | 8-12 |

*The amount of each admixture is 0.2% of the cement (as effective component).

EXAMPLE 2

Various dispersants indicated below were used in combination with an admixture of the invention, followed by the concrete test in the same manner as in Example 1.

In Table 4, there are shown various dispersants used and mixing ratios of the copolymer of isobutylene and maleic anhydride and zinc oxide.

In Table 5, there are shown the concrete test results immediately after the formulation.

In Table 6, there are shown the concrete test results after 3 months at 40° C.

Dispersants Used (A) β-Naphthalenesulfonic acid/formaldehyde high condensation product (B) Water-soluble salt of sulfonated melamine resin (C) Ligninsulfonic acid (D) Mixture of 50 parts by weight of β-Naphthalenesulfonic acid/formaldehyde high condensation product and 50 parts by weight of ligninsulfonic acid (E) Mixture of 50 parts by weight of β-Naphthalenesulfonic acid/formaldehyde high condensation product and 50 parts by weight of polyacrylic acid.

Mixture of the employed copolymer and zinc oxide: mixture of 100 parts by weight of the copolymer and 50 parts by weight of zinc, an average size of 0.7 μm.

TABLE 4

Combinations with Various Cement Dispersants

| No. | Type of Product | Employed Dispersant | Amount (Based on Cement, %) Dispersant | Admixture of Invention | pH* |
|---|---|---|---|---|---|
| 20 | Product of Invention | A | 0.5 | 0.2 | 8.0 |
| 21 | | B | 0.8 | 0.2 | 8.0 |
| 22 | | C | 0.5 | 0.2 | 8.0 |
| 23 | | D | 0.5 | 0.2 | 8.0 |
| 24 | | E | 0.4 | 0.2 | 8.0 |
| 25 | for Comparison | A | 0.5 | 0.2 | 5.0 |
| 26 | | D | 0.5 | 0.2 | 5.0 |

*pH measured using a 30% solution.

TABLE 5

Concrete Test Results Obtained Immediately After Formulation

| No. | Type of Product | Employed Dispersant | Immediately After Formulation | Variation of Slump With Time (cm) | | |
|---|---|---|---|---|---|---|
| | | | | After 30 | After 60 | After 90 |
| 20 | Inventive Product | A | 20.1 | 20.0 | 20.0 | 19.8 |
| 21 | | B | 20.2 | 20.1 | 20.0 | 19.8 |
| 22 | | C | 20.5 | 20.3 | 20.3 | 20.2 |
| 23 | | D | 20.4 | 20.3 | 20.3 | 20.0 |
| 24 | | E | 20.5 | 20.4 | 20.3 | 20.2 |
| 25 | for comparison | A | 20.5 | 20.1 | 20.0 | 20.1 |
| 26 | | D | 20.4 | 20.0 | 19.9 | 19.9 |

TABLE 8

Concrete Test Results Obtained After 3 Months at 40° C.

| No. | Type of Product | Employed Dispersant | Immediately After Formulation | Variation of Slump With Time (cm) | | |
|---|---|---|---|---|---|---|
| | | | | After 30 | After 60 | After 90 |
| ·20 | Inventive Product | A | 20.5 | 20.4 | 20.3 | 20.2 |
| 21 | | B | 20.2 | 20.1 | 20.0 | 20.0 |
| 22 | | C | 20.4 | 20.4 | 20.3 | 20.0 |
| 23 | | D | 20.1 | 20.1 | 20.0 | 20.0 |
| 24 | | E | 20.3 | 20.4 | 20.3 | 20.3 |
| 25 | for comparison | A | 21.3 | 18.8 | 15.2 | 12.2 |
| 26 | | D | 20.5 | 16.2 | 13.0 | 10.2 |

We claim:

1. An aqueous dispersant composition for cement consisting essentially of 100 parts by weight of a copolymer of an olefin having 2 to 8 carbon atoms and an ethylenically unsaturated dicarboxylic anhydride, the copolymer being in the form of fine particles having an average size of from 0.1 to 20 microns, 15 to 300 parts by weight of zinc, the zinc being in the form of a compound selected from the group consisting of zinc oxide and zinc hydroxide, and water, the composition having a pH of from 6 to 12.

2. A composition as claimed in claim 1, in which the amount of zinc is from 40 to 100 parts by weight.

3. A composition as claimed in claim 1, in which the copolymer particles have an average size of from 0.1 to 5 microns.

4. A composition as claimed in claim 1, in which the zinc oxide or zinc hydroxide is provided in the form of particles having an average size of from 0.1 to 5 microns.

5. A composition as claimed in claim 1, in which the dicarboxylic anhydride is maleic anhydride.

6. A composition as claimed in claim 1, in which the copolymer has an average molecular weight of 500 to 50,000.

7. A cement admixture comprising hydraulic cement and an aqueous dispersant composition, said aqueous dispersant composition consisting essentially of 100 parts by weight of a copolymer of an olefin having 2 to 8 carbon atoms and an ethylenically unsaturated dicarboxylic anhydride, the copolymer being in the form of fine particles having an average size of from 0.1 to 20 microns, 15 to 300 parts by weight of zinc, the zinc being in the form of a compound selected from the group consisting of zinc oxide and zinc hydroxide, and water, said aqueous dispersant composition having a pH of from 6 to 12.

8. An admixture as claimed in claim 7, in which the dicarboxylic anhydride is maleic anhydride.

9. An admixture as claimed in claim 7, in which the copolymer has an average molecular weight of 500 to 50,000.

10. An admixture as claimed in claim 7, in which the zinc oxide or zinc hydroxide is provided in the form of particles having an average size of from 0.1 to 5 microns.

* * * * *